Dec. 17, 1968  J. M. BARRERA  3,416,569
MIXING FAUCET

Filed July 27, 1966  2 Sheets-Sheet 1

INVENTOR.
JOSE MARLET BARRERA

BY  ATTORNEYS.

Dec. 17, 1968    J. M. BARRERA    3,416,569
MIXING FAUCET

Filed July 27, 1966    2 Sheets-Sheet 2

INVENTOR.
JOSE MARLET BARRERA

BY    ATTORNEYS.

3,416,569
MIXING FAUCET
Jose Marlet Barrera, P.O. Valldoreix No. 6, San Cugat del Valles, Barcelona, Spain
Filed July 27, 1966, Ser. No. 568,302
Claims priority, application Spain, July 30, 1965, 316,279
8 Claims. (Cl. 137—606)

ABSTRACT OF THE DISCLOSURE

A mixing faucet having a pair of axially aligned inlet chambers each provided with an inlet valve mounted on a common actuating rod, surrounded by a rotatable eccentric valve control member which operates the inlet valves simultaneously through the common actuating rod, slidably mounted in the cam and inlet chambers.

---

This invention relates to faucets and more particularly to mixing faucets for blending two liquids such as hot and cold water.

The usual mixing faucet now in use includes a faucet supplied from two separate inlets each of which is individually controlled by an independently actuated valve. Consequently, to obtain the desired blend of liquids it is necessary to adjust each of the valves separately both to obtain the desired blend and the volume of flow. Moreover, the adjustment of the valves must be effected each time that liquid flow is desired.

Having in mind the defects of the prior apparatus, it is the primary object of the present invention to provide a unitary mixing faucet in which the blend of liquids may be effected by actuation of a single valve control member.

It is another object of the invention to provide a mixing faucet with a unitary blending valve assembly with a flow control valve so that once the desired blend of liquids is established it may be maintained and flow may be turned on, off or regulated without altering the liquid blend.

It is a further object of the invention to provide a mixing faucet of the foregoing type having simplicity of design, economy of construction, compactness of assembly and efficiency in operation.

The novel features that are considered characteristic of the invention are set forth with particularity in the appended claims. The invention itself, however, both as to its organization and its method of operation, together with additional objects and advantages thereof, will best be understood from the following description of specific embodiments when read in connection with the accompanying drawings, wherein like reference characters indicate like parts throughout the several figures and in which:

Figure 1:
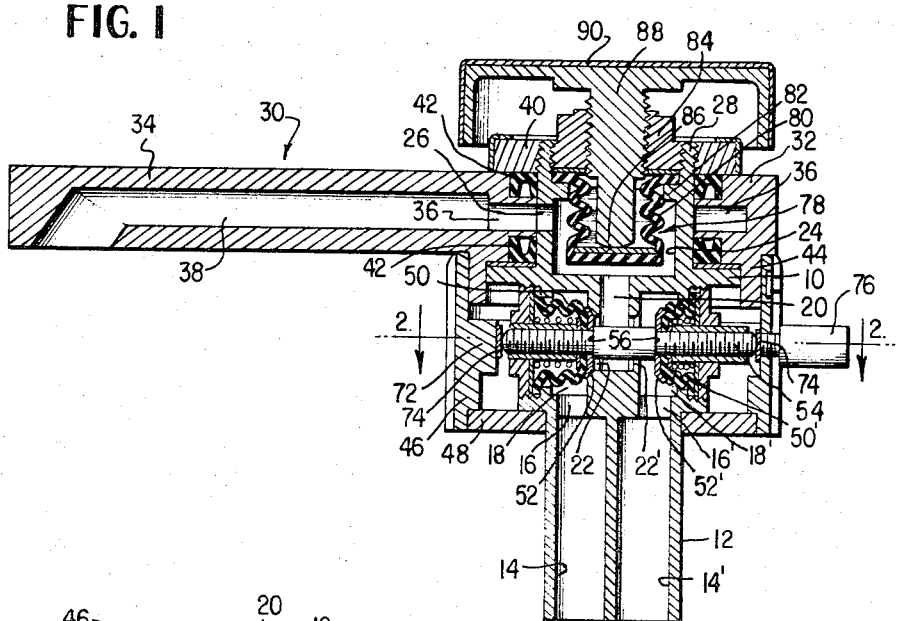
FIG. 1 is a cross-sectional view taken axially through a faucet incorporating the present invention.
Figure 2:
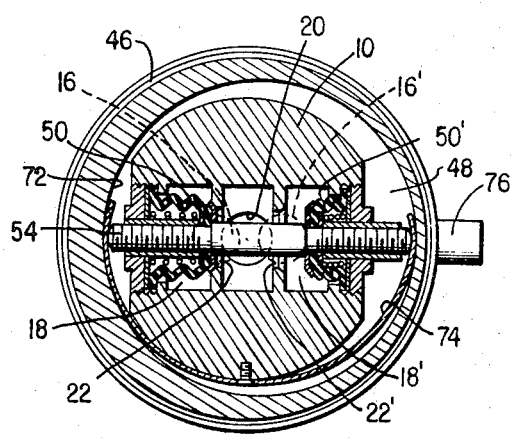
FIG. 2 is a cross-sectional view taken on line 2—2 of FIG. 1.

Referring now to the drawings, specifically to FIGS. 1 and 2, a faucet in accordance with the present invention comprises a central body or core 10 having an axially extending tubular portion 12, both of which are partitioned to define two separate inlet passages 14, 14', as for cold and hot water, in the tubular portion, inlet orifices 16, 16' in communication with said passages and opening into inlet valve chambers 18, 18', a mixing chamber 20 between and in communication through valve openings 22, 22', with the inlet valve chambers 18, 18', and an outlet chamber 24 having an outlet orifice 26. The body or core and the tubular portion may comprise a unitary cast or molded structure formed of any suitable material.

The body portion 28 surrounding the outlet chamber 24 and containing the outlet orifice 26 is cylindrical and pivotally supports a dispensing unit 30 including an annular body 32 mounted on the cylinder 28, and discharge nozzle 34. The body 32 has an annular outlet chamber 36 which is open to the outlet orifice 26 and which opens into a discharge passage 38 in the nozzle 34. The dispensing unit 30 is retained by a nut 40 threaded on the cylindrical portion 28. The joint between the cylinder 28 and annulus 32 is sealed by gaskets 42.

The annular discharge body 32 has a depending annular flange 44 on which a cylindrical shell 46 is rotatably mounted, the latter being retained by an annular closure 48 fitted on the tubular portion 12 and secured to the body 10. Inlet valves 50, 50' are disposed in the inlet chambers 18, 18' for cooperation with the valve openings 22, 22', respectively, the latter constituting valve seats. The inlet valves 50, 50' comprise valve members 52, 52' mounted on a valve rod 54 disposed diametrically of the body 10. The inlet valve members 52, 52' are seated against a pair of shoulders 56 on the rod 54 and the latter is slidably mounted for longitudinal movement by a pair of headless sleeve nuts 58 threaded on each end thereof and slidably within axial bores in a pair of externally threaded nuts 60 threaded in the body 10 and closing the inlet chambers 18, 18'.

Figure 3:
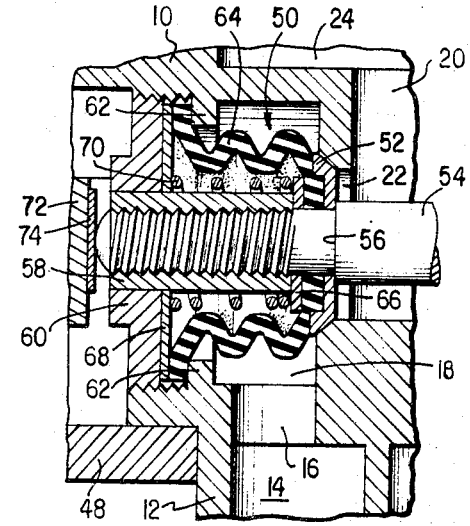
FIG. 3 is an enlarged fragmentary cross-sectional view of an inlet valve.

As best shown in FIG. 3 the inlet chambers 18, 18' are each bounded by an internally extending rim 62 parallel with the walls containing the valve opening 22, 22' and against which the nuts 60 are seated. The valves 50, 50' are sealed by elastic and/or flexible bellows shaped sleeves 64 of liquid proof material, one end of which is secured around the rod 54 by being sandwiched between the valve member 52, 52' and a washer 66 retained by the sleeve nut 58, and the other end of which is secured to the body 10 by being sandwiched between the rim 62 and a washer 68 retained by the nut 60. A coil spring 70 surrounds the sleeve nut 58 between the washers 66 and 68 to protect the rod from collapse of the sleeve 64 and assist in actuation of the rod.

The cylindrical shell 46 has an internally disposed eccentric cam 72, best shown in FIG. 2, and the diameter of this cam is substantially equal to the length of the valve rod 54 plus the thicknesses of a leaf spring 74 secured to the body 10 and whose ends are disposed between the respective ends of the rod 54 and the surface of the cam 72. The shell 46 has an external handle 76 for revolving the shell on the flange 44. As the shell 46 is revolved, the eccentric cam 72 moves the valve rod 54 longitudinally to actuate the inlet valves 50, 50' between one of two extremes in which one of the valve openings 22, 22' is closed and the other fully open, or in an intermediate position in which the two liquids are selectively mixed. The leaf spring 74 is under compression and follows the cam 72 so that it functions as a shoe for the ends of the valve rod 54 and eliminates friction thereon.

The actual liquid flow through the nozzle 34 is controlled by a shut-off valve 78 in the outlet chamber 24. This valve conveniently comprises an elastic and/or flexible bellows-like liquid proof sack 80 having its edge portion clamped against a rim 82 within the cylinder 28 by a nut 84. A plate 86 is disposed within the sack 80 and is engaged by a shank 88 threaded through the nut 84 and having an external knob 90. Thus, by turning the knob 90 in one direction, the shank 88 will be threaded inwardly to press the plate 86 and sack 80 against the bottom of the chamber 24 to stop flow from the mixing chamber 20. By turning the knob in the opposite direction to the desired extent the valve 78 will be lifted by liquid pressure and flow at the desired rate will be established through the nozzle 34.

Figure 4:
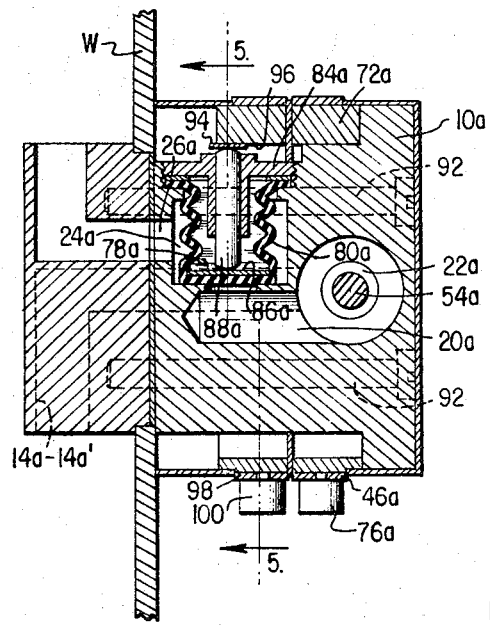
FIG. 4 is a cross-sectional view taken axially through a modified faucet according to the invention.
Figure 5:
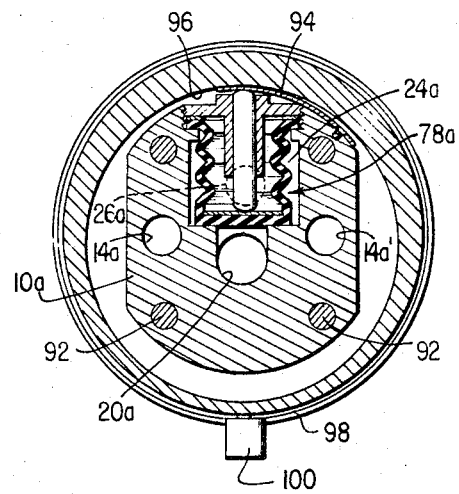
FIG. 5 is a cross-sectional view taken on line 4—4 of FIG. 4.

If desired, the shut-off valve can be cam operated as shown in FIGS. 4 and 5, this arrangement being particularly useful in the control for a shower, the valve being shown in FIG. 4 as mounted in the wall W of a shower stall. This valve has a two part body 10a mounted on opposite sides of the wall W and secured together by bolts 92. The body has inlet passages 14a, 14a' leading into inlet valve chambers as previously described, valve passages 22a, 22a', a mixing chamber 20a, an outlet chamber 24a, an outlet passage 26a, inlet valves on a valve rod 54a controlled by a cam 72a in a shell 46a having a handle 76a, and a shut-off control valve 78a in the outlet chamber 24a.

The shut-off valve 78a comprises a sack 80a, secured by a nut 84a which slidably supports a rod 88a for pressing the bearing plate 86a. The outer end of the rod 88a engages a leaf spring 94 carried by the body 10a and which slidably bears on an eccentric cam 96 carried by a rotatably mounted ring or shell 98 and having an operating handle 100. Thus, the handle 76a may be operated to effect the blending of hot and cold water and the handle 100 may be operated to turn on, off or regulate the volume of flow of the blended water.

Figure 6:
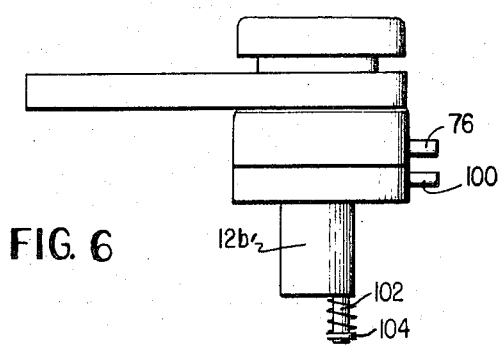
FIG. 6 is an elevational view of another modification of the invention.
Figure 7:
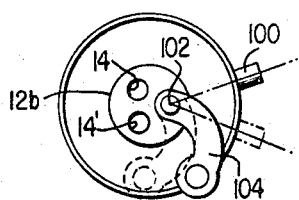
FIG. 7 is a bottom plan view of the faucet of FIG. 6.

A further modification shown in FIGS. 6 and 7 comprises the provision of a cam operated shut-off valve in a body structure of the type shown in FIG. 1. In this arrangement, the tubular portion 12b of the body is provided with a third bore, in addition to the inlet passages 14, 14', and in which is rotatably mounted a shaft 102 having a handle 104, the shaft 102 being connected with the handle 100 for operating the shut-off valve.

Although certain specific embodiments of the invention have been shown and described, it is obvious that many modifications thereof are possible. The invention, therefore, is not to be restricted except insofar as is necessitated by the prior art and by the spirit of the appended claims.

What is claimed is:

1. A mixing faucet comprising a valve body formed with a pair of aligned inlet chambers each having aligned valve openings in communication with a mixing chamber therebetween, an inlet control valve in each of said inlet chambers, an eccentric cam rotatably mounted on said body in surrounding relation to said inlet chambers, and a valve rod of a length substantially corresponding to the diameter of said eccentric cam and slidably extending through said inlet chambers and valve openings and carrying said inlet valves, whereby said inlet valves may be operated simultaneously by rotation of said cam to effect flow control and blending of liquids from said inlet chambers.

2. A mixing faucet according to claim 1 comprising leaf spring means carried by said body and overlying the ends of said valve rod and in engagement with said cam to act as shoes for said rod ends and preventing friction and lateral tension thereon.

3. A mixing faucet according to claim 1, wherein said body comprises an outlet chamber in communication with said mixing chamber with an outlet for discharging liquid, and a shut-off control valve controlling discharge from said outlet chamber.

4. A mixing faucet according to claim 3 wherein said shut-off valve comprises a liquid impervious sack enclosing a bearing plate, and a threaded shank having an external operating knob and engaging said bearing plate for operating said valve.

5. A mixing faucet according to claim 4 comprising a discharge unit including a nozzle having a discharge passage and an annular body carrying said nozzle and rotatably mounted on said valve body, said annular body having an annular discharge chamber in communication with said nozzle passage and with said outlet regardless of the angular position of said nozzle.

6. A mixing faucet according to claim 3 wherein said shut-off valve comprises a slidably mounted valve rod, and a second rotatably mounted eccentric cam engaging said latter valve rod for actuating said valve.

7. A mixing faucet according to claim 6 wherein said valve body has three parallel bores two of which constitute inlet passages respectively in communication with said inlet chambers, and a shaft rotatably mounted in said third bore and operative to rotate one of said eccentric cams.

8. A mixing faucet according to claim 1, wherein said inlet valves each include a valve member fixed on said rod and an expansible liquid proof sleeve secured between said valve member and the respective valve chamber wall.

References Cited

UNITED STATES PATENTS

| 2,616,710 | 11/1952 | Woodruff | 137—607 X |
| 2,753,891 | 7/1956 | Parker | 137—607 X |
| 3,312,248 | 4/1967 | Browning | 137—636.2 |

LEONARD D. CHRISTIAN, *Primary Examiner.*

U.S. Cl. X.R.

137—609, 614.11, 628